United States Patent
Moretti

[11] Patent Number: 5,814,348
[45] Date of Patent: Sep. 29, 1998

[54] QUICK DIE CHANGE DEVICE USED IN FOAMING OF INSULATION FOR REFRIGERATOR CABINETS

[76] Inventor: Bruno Moretti, Via F. lli Bronzetti, 4, I 27029 Vigevano, Italy

[21] Appl. No.: 853,952

[22] Filed: May 9, 1997

Related U.S. Application Data

[63] Continuation of Ser. No. 443,022, May 17, 1995, abandoned.

Foreign Application Priority Data

Jun. 9, 1994 [IT] Italy ................. PV940003 U

[51] Int. Cl.⁶ ............. B29C 33/30; B29C 44/58
[52] U.S. Cl. ............. 425/4 R; 249/102; 425/183; 425/817 R
[58] Field of Search ............. 425/183, 186, 425/188, 190, 4 R, 191, 817 R; 249/162, 170, 102, 103

[56] References Cited

U.S. PATENT DOCUMENTS

| | | |
|---|---|---|
| 52,790 | 2/1866 | McArthur ................. 249/102 |
| 585,154 | 6/1897 | Beddall ................. 249/102 |
| 4,664,614 | 5/1987 | De Rossi ................. 425/190 |
| 5,064,584 | 11/1991 | Jefferies ................. 425/183 |
| 5,230,908 | 7/1993 | Morgan ................. 425/183 |
| 5,413,472 | 5/1995 | Dietterich et al. ................. 249/102 |
| 5,415,540 | 5/1995 | Proksa et al. ................. 425/183 |

*Primary Examiner*—Patrick Ryan
*Assistant Examiner*—Joseph Leyson
*Attorney, Agent, or Firm*—Stevens, Davis, Miller & Mosher, L.L.P.

[57] ABSTRACT

A quick die change device for use in foaming of insulation for refrigerator cabinets comprising a bottom die suitable for working together with an upper die plate bearing a plurality of dies for obtaining the insulation. The size of the insulation changes as the dimensions of the refrigerator cabinets change. The dies are placed in such a way as to work together with the bottom die by rotating the die plate around a minor axis. The rotation is obtained by a gear motor, a number of belts and a shaft coinciding with the minor axis of the plate.

10 Claims, 1 Drawing Sheet

QUICK DIE CHANGE DEVICE USED IN FOAMING OF INSULATION FOR REFRIGERATOR CABINETS

This application is a continuation of application Ser. No. 08/443,022, filed May 17, 1995 (abandoned).

BACKGROUND OF THE INVENTION

The present invention refers to a quick die change device used in prefoaming of insulation for refrigerator cabinets prior to assembling the cabinets. In the construction of refrigerator cabinets there is an intermediate polyurethane layer between the external and internal walls of the cabinet which act as insulation. The insulation has the same shape as the cabinet and it is obtained by assembling the cabinet and then foaming in place the polyurethane or preshaping the insulation prior to assembling the refrigerator cabinet.

Refrigerator cabinets have different capacities and consequently various dimensions. Every time a refrigerator cabinet having dimensions differing from the previous one has its insulation preshaped, it is necessary to change the dimensions of the insulation and consequently the dimensions of the die used for obtaining such insulation.

In the prior art, a quick die change is used having a die plate bearing two opposite dies and the necessary means for swivelling said plate along the major axis in order to get the die into the injection poosition.

A drawback of this solution is poor accuracy in setting the new die to the operative position, i.e. it is not certain that the die plate, when turning, gets into the proper position, that is, it slants along one of the longer sides, so that when the polyurethane is foamed, it generates an uneven thickness of the vertical insulation layers, thin close to the rear side and very thick towards the front side. This results in difficulty inserting the insulation between the internal and external wall of the refrigerator cabinet when the refrigerator is being assembled. Moreover, no uniform insulation of the cabinet is assured, which results in malfunctioning of the refrigerator.

A further drawback of this solution consists in the remarkable distance that must be kept between the machines to be able to swivel the die along the major axis. As a matter of fact, mass production uses several machines for molding the insulation and all machines stand close to one another. As more space is needed for swivelling the die, the overall dimensions of the machines increase and consequently either the bays are enlarged, or the number of the machines is reduced, which means smaller output. It is evident that this all will strongly affect the final cost of the product.

The object of the present invention is to overcome the above mentioned inconveniences.

SUMMARY OF THE INVENTION

The technical problem to be solved was the making of a quick die change device, reliability, showing no positioning faults at the insulation foaming stage, and easily applicable to the already available machines.

The solution of the technical problem is characterized by the fact that a die plate, suitable for working together with a bottom die beneath, bears a fixed number of dies for obtaining said insulation change as the dimensions of the refrigerator cabinet change, the sides set in such a position as to work together with said bottom die by swivelling of said die plate along the minor axis intermediate its ends.

BRIEF DESCRIPTION OF THE DRAWINGS

Further advantages and characteristics will be more evident from the following description and from the accompanying drawings where.

DESCRIPTION OF THE PREFERRED EMBODIMENT

Figure 1:
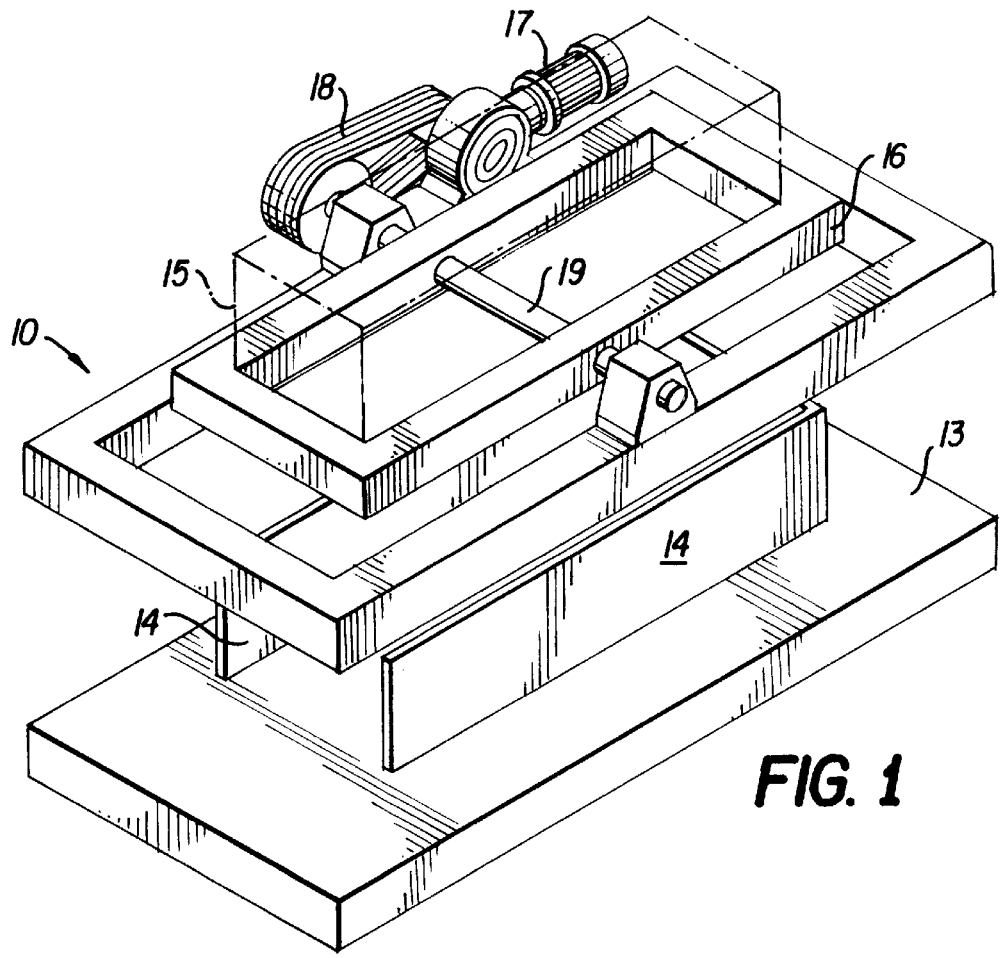
FIG. 1 is a perspective view of the device object of the present invention applied to an insulation molding/foaming machine.
Figure 2:
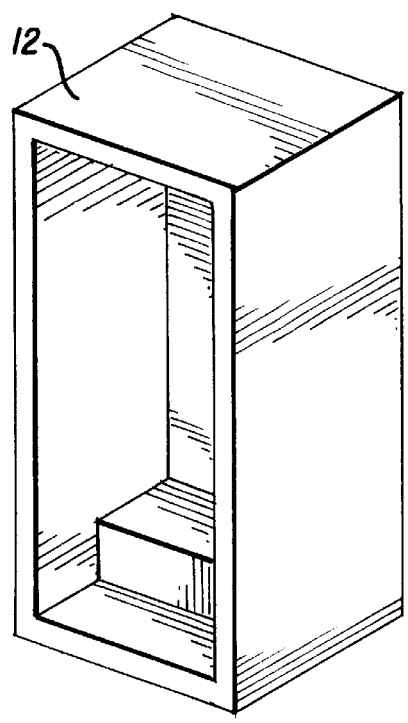
FIG. 2 is a perspective view of the molded/foamed insulation.

By referring to FIG. 1, it is indicated in a generic way with 10 a system for molding/foaming the polyurethane insulation 12 shown in FIG. 2 which is inserted between the external wall and the internal wall of the refrigerator cabinet.

The system 10 has not been fully illustrated as it belongs to the prior art, while the device object of the present invention has been highlighted. The system 10 consists of a bottom die 13, adjustable in height, bearing vertical walls 14, swinging and working together with a die on the top born by a die plate 16. A further die 15, located on the top of plate 16, will work together with the vertical walls 14 for obtaining another insulation layer 12 as it will be explained later.

When the production of refrigerator cabinet is changed and also the dimensions of the insulation must be changed, a gear motor 17 is actuated which transmits the motion of a number of belts or chains 18 that cause the shaft 19 to rotate to which die plate 16 is fastened. Through the above mentioned kinematic chain gear motor-belts-shaft, die plate 16 turns die 15 into the matching position and ready for working with the vertical walls 14 of bottom die 13. By swivelling die plate 16 along the minor axis, if said plate 16 would not assume the correct position when turning, i.e. it wouldn't have die 15 in a parallel position to bottom die 13, when the vertical walls 14 come into contact with plate 16, plate 16 is caused to rotate by a quantity which is just enough for moving die 15 to the correct position. The force necessary for obtaining the correct position is, evidently, very small. Since the lever arm from the further end to the axis of rotation of shaft 19 is very high. Therefore it is necessary that only a very small force is needed for achieving the correct positioning of die plate 16 relative to the vertical walls 14. These has been illustrated and described a device where die plate 16 rotated by a half turn, as the dies provided for are two, but they may be more than two; in such a case the die plate will rotate by a fraction of rotation equal to the number of dies it bears.

The above described quick change device can be easily applied also to the available machines, as only few changes are necessary to adapt the device of the present invention to said machines.

I claim:

1. A quick die change device for use in the foaming of insulation for refrigerator cabinets comprising a bottom die adjustable in height, an upper die plate and a means to mechanically swivel said upper die plate, said upper die plate bearing a fixed number of differently contoured dies for obtaining insulation dimension changes as the dimensions of the refrigerator cabinet change, and being suitable for working together with said bottom die, said differently contoured dies being placed in such a way as to work together with said bottom die by swivelling of said upper die plate along a minor axis.

2. The device according to claim 1 wherein said dies located on the die plate are at least two.

3. The device according to claim 1 wherein said means include a gear motor and a number of belts transmitting motion to a shaft to which said die plate is fastened, said shaft coinciding with the minor axis of said plate.

4. The device according to claim 1, wherein said die plate has opposed ends, said means to mechanically swivel comprises a transverse shaft (19) about which said die plate is rotatable, said shaft coinciding with a minor axis of said die plate, said minor axis being transverse to a longitudinal axis and equidistant from opposed ends of said die plate.

5. The device according to claim 4, wherein said die plate has a perimeter greater than that of each of said contoured dies, wherein said die plate extends transversely from each of said contoured dies sufficiently such that said upper die plate is movable to contact said bottom die and rotate about said transverse shaft to align said upper die plate with said bottom die.

6. The device according to claim 5, comprising more than two dies attached to the die plate.

7. The device according to claim 5, wherein said die plate is rotatable by a half turn.

8. The device according to claim 4, wherein at least one said contoured die protrudes from said dies plate.

9. The device according to claim 4, wherein two said contoured dies protrude from said die plate and said shaft is between said dies.

10. The device according to claim 8, wherein said bottom die and said die plate are relatively movable towards each other, said bottom die has vertical walls, said die plate extends sufficiently transversely from said at least one contoured die such that when said die plate contacts said bottom die, said die plate is contacting said vertical walls and one of said contoured dies protrudes from said die plate to be between said vertical walls, said contact of said walls and plate aligns said protruding die with said vertical walls, and said die plate only turns about said transverse shaft.

* * * * *